United States Patent [19]

Mitchell et al.

[11] Patent Number: 5,018,470
[45] Date of Patent: May 28, 1991

[54] LINEAR ACTUATED VALVE WITH REMOTE ACTUATION

[75] Inventors: William J. Mitchell, Clermont, Fla.; Albert L. Grumelot, St. Mary's, Ohio

[73] Assignee: Master Concepts Inc., Orlando, Fla.

[21] Appl. No.: 536,789

[22] Filed: Jun. 12, 1990

[51] Int. Cl.$^5$ ............................................. B63B 13/00
[52] U.S. Cl. .................................. 114/183 R; 114/197; 251/294
[58] Field of Search ............... 114/183 R, 183 A, 184, 114/185, 197, 198; 137/386, 446, 613, 614.11, 614.13, 614.14; 417/1, 26, 28; 251/213, 251, 262, 263, 294, 309, 310

[56] References Cited

U.S. PATENT DOCUMENTS

| | | | |
|---|---|---|---|
| 1,114,019 | 10/1914 | Morris | 137/426 |
| 2,008,449 | 7/1935 | Hladik | 121/34 |
| 2,326,138 | 8/1943 | Grant, Jr. | 74/110 |
| 2,550,379 | 4/1951 | Rapisarda | 299/95 |
| 2,711,303 | 6/1955 | Ephraim | 251/294 |
| 3,757,612 | 9/1973 | Schaefer | 251/284 |
| 4,432,348 | 6/1990 | Nix | 114/183 R |
| 4,693,690 | 9/1987 | Henderson | 114/183 R |
| 4,856,756 | 8/1989 | Combs | 251/294 |

Primary Examiner—Sherman Basinger
Assistant Examiner—Clifford T. Bartz
Attorney, Agent, or Firm—Nixon & Vanderhye

[57] ABSTRACT

The remotely operated linear actuated valve includes a sleeve open at one end with radial ports about the sleeve. A valve seat is disposed between the open end and the ports. A valve member is slidable axially in the sleeve. Slots are formed through the sleeve and valve member to receive a guide for a cam, the valve member carrying a cam follower. By linearly displacing the cam in a direction normal to the axial direction, the valve member is moved between valve closed and valve open positions. A cap is releasably secured on the sleeve whereby ready and quick disassembly and reassembly of the valve elements may be effected.

21 Claims, 4 Drawing Sheets

LINEAR ACTUATED VALVE WITH REMOTE ACTUATION

BACKGROUND AND SUMMARY OF THE INVENTION

The present invention relates to linear actuated valves for selectively opening and closing fluid ports and particularly relates to remotely operated linear actuated valves specifically useful for draining the bilge of a boat.

Many and various types of linear actuated valves have been proposed and constructed in the past. For example, U.S. Pat. No. 1,114,019 discloses a valve having a linearly actuated cam cooperable with a roller arrangement to open and close the valve. In many applications, however, it is important to design a valve consistent with predetermined criteria essential to proper operation of the valve for that particular application. For example, it is frequently desirable to have little or no control pressure for maintaining the valve in a valve-open or a valve-closed position. Additionally, it is often desirable to maintain the valve in a stable condition in either of the valve-closed or valve-open positions. Quick disassembly and reassembly of the valve when placed in use is sometimes an additional criteria, particularly where frequent use of the valve results in the potential for valve malfunction, for example, when debris or other material tend to clog the workings of the valve. Consequently, quick disassembly of the valve for cleaning purposes, as well as reassembly, is essential in certain applications. Also, it is desirable to have the valve actuated at 90 degrees to the axis of movement of the valve itself. This is because of space constraints. Additionally, valve disassembly is necessary for each engine oil change because the drain tube from the oil pan is typically passed through the bilge hole during oil changes. Additionally, many applications require actuation of the valve from a remote location. This, of course, is frequently accomplished by using electrical signals or various types of cables for mechanically actuating the valve. However, it also presents problems which must be solved consistent with the above and other criteria for the design of the valve.

As an example of the foregoing, hazardous materials, such as chemicals, are often transported in containers between distribution and end-use sites where it is necessary to drain the containers. In certain situations, this involves opening the container on-site and installing a valve. If the contents are hazardous to workers, an obvious health and safety threat exists. However, a valve in such container operated from a remote location, albeit from another portion of the container, might safely be used, particularly where the valve is completely within and inaccessible from outside of the container.

As a further example of a particular application of a valve designed according to the above-identified criteria, a linear actuated valve may be used in a drain for the bilge of a boat. In many types of boats, for example, ski boats with inboard engines, the drain for the bilge is located directly below the engine. To access the bilge and open the drain, it is often necessary to remove equipment, such as water skis, stacked on the boat deck and/or on the engine cover. It is also necessary for an individual to raise the engine housing cover and get down on his hands and knees to reach the handle, which is conventionally screwed into a drain port at the bottom of the bilge. Not infrequently, the handle cannot be turned because of the awkward angle and the lack of available leverage. Thus, to drain the bilge is awkward at best and may also be hazardous if the engine remains hot. Because of that substantial inconvenience and hazard, not infrequently the drain plugs in bilges are left in place at all times. While electric bilge pumps have been employed, they do not remove all of the water in the bilge. Thus, the drain in the bilge of a boat is another example of an application where a remotely actuated valve would be highly useful in accordance with the above design criteria. Thus, the remotely operated linear actuated valve of the present invention will be described in connection with its application as a valve for use in draining the bilge of a ski boat. However, it will be understood that the valve hereof has other and different applications.

Accordingly, the present invention provides a novel and improved linear actuated valve, particularly useful in those applications requiring remote actuation, and wherein control pressure to maintain valve open or closed is not required, and minimal control pressure for operation is required. It is also useful in those situations where quick disassembly and reassembly of the valve is desirable. In a preferred embodiment of the present invention, the linear actuated valve hereof comprises a valve body in the form of an elongated sleeve with an axially opening port at one end and radial openings along the sides of the sleeve, together with a valve seat in the sleeve between the openings and adjacent the one sleeve end. Thus, the valve body is disposed in a port for controlling fluid communication through the port. The sleeve has a pair of diametrically opposed slots opening laterally through the sleeve and extending substantially the majority of its length. A valve member is disposed within the sleeve and includes a seal, for example, an O-ring seal at one end, for sealing against the valve seat. The member has a lateral slot therethrough in registry with the opposed slots of the sleeve. A cap is releasably secured over the end of the valve body remote from the valve seat and retains a helical coil spring between the cap and an end of the valve member biasing the member into a valve-closed position. A cam follower, for example, a roller, is disposed in the slot in the member.

To displace the member between valve-closed and valve-opened positions, a cam is provided which extends laterally through the registering slots of the sleeve and member. The cam may be disposed in the sleeve in either direction (180°) depending on the direction of routing of the control cable therefor. The cam has cam surfaces comprised of a pair of flats at different elevations and spaced laterally one from the other by an inclined surface. By linearly displacing the cam in the lateral direction, that is, in a direction generally normal to the axis of the valve member, the valve member may be displaced between valve open and closed positions. To displace the cam, a mechanical cable actuator, for example, a bowden cable, may be used and actuated by a control knob conveniently located in the boat, i.e., on its dash. More particularly, when the valve member lies in the valve-closed position, the cam follower carried by the valve member rests on the lower cam flat. To open the valve, the remote control knob is operated to displace the cam laterally such that the inclined cam surface engages the cam follower, thereby raising the valve member from its seat. At the end of the cam stroke, the cam follower rests on the upper flat and the valve member lies in a full valve-opened position. Movement of the cam in the opposite direction, of course, permits the valve member to return to its closed position under the bias of the spring.

To facilitate movement of the cam, a guide is provided and includes a pair of laterally spaced guide plates having a base frame disposed therebetween. The base frame has a slot along its underside for engaging and interlocking with the base of the slots in the valve sleeve, preventing lateral movement of the guide. The cam slides along the base frame between the guide plates. The bias of the spring maintains this subassembly within the slots of the valve sleeve and member.

It will be appreciated that, with the foregoing-described arrangement, there are no control pressures applied to the remote actuator when the valve lies in either of its fully open or closed position because the spring bias operates against the cam flats. Any forces acting on the valve tending to move it from its fully closed or open positions are thus not transmitted to the remote actuator. Additionally, quick disassembly and reassembly of the valve is accomplished by this construction. Particularly, the cap is removable from the sleeve, for example, by removing a spring clip interconnecting the cap and sleeve, thus enabling the spring to be removed through the end of the valve sleeve. Upon its removal, it will be appreciated that the guide, including the cam, the valve member and cam follower can be displaced along these slots and completely withdrawn from the sleeve through its upper end. The removed parts can thereafter be disassembled one from the other, for example, for cleaning. To reassemble the valve parts, the guide including the cam, and the valve member including the cam follower, may be inserted into the sleeve, with the guide and cam extending along the slots of the sleeve and member. The spring is then inserted and the cap is re-secured to the end of the sleeve.

In another embodiment of the present invention, the cam is provided with a lower flat and an inclined surface but without an upper flat. Thus, the spring-biased forces acting on the valve body when the cam lies in the open position tend to move the cam toward the valve closed position. To ensure that the valve is self-closing, the cam may be provided with an aperture for receiving a coil spring. Opposite ends of the coil spring bear against the cam and a projection on the guide to bias the cam into the valve closed position.

It will be appreciated that the foregoing-described valve is useful in many applications, but has particular use as a valve for draining the bilge of a boat. To use the valve in that application, the lower end of the sleeve may be externally threaded and threaded into the drain opening in the bottom of the hull. Conventionally, an internally threaded fitting is disposed in the drain opening and this fitting receives the externally threaded end of the sleeve. Thus, the valve body upstands from the drain opening and without any protrusions along the outside hull surface. A mechanically actuated bowden-type cable may be connected between the cam and an actuator, e.g., a control knob, located on the dash of the boat. Electrical, hydraulic or pneumatic power can be used to actuate the valve. However, manual valve operation is less expensive and more trouble-free, particularly with a bowden-type cable. Thus, the valve may be opened and closed by simple push-pull operation of a control knob on the dash. Also, there may arise an occasion for manual operation of the valve at the valve body itself. To facilitate this, the cam is extended to provide a handle accessible externally of the guide. Thus, a simple pull or push on the handle will operate the valve similarly as the remote actuation.

Further, it is desirable to provide a mechanism for quickly disconnecting the valve from the actuating cable. To this end, the valve is provided with a guillotine mechanism for cutting the cable. Specifically, a manually-operated lever is provided at the valve which displaces a metal strip having an aperture formed in part by a cutting edge. By displacing the strip, the cutting edge severs the cable, freeing the valve for manual operation.

In a preferred embodiment according to the present invention, there is provided a linear actuated fluid valve, comprising a valve body including an elongated sleeve having an axis, generally opposed slots through opposite side walls thereof, a first valve opening through a side wall, a second valve opening through an end of the sleeve, and a valve seat about the sleeve between the openings. A valve member is disposed in the sleeve and is movable axially between a valve closed position engageable with the seat and a valve open position spaced from the seat to enable fluid communication between the first and second openings, the member having a laterally opening slot therethrough in registry with the opposed slots of the sleeve. Means are carried by the sleeve for biasing the valve member toward one of the valve open or valve closed positions. A cam follower is carried by the member in the slot thereof, and a cam is carried by the body for movement in the slots of the sleeve and the slot of the member in a direction generally normal to the axis of the body, the cam having a surface engageable with the cam follower enabling movement of the member toward the one valve open or valve closed position in response to movement of the cam in the normal direction and the bias of the biasing means. Means are provided for linearly moving the cam along the slots.

In a further preferred embodiment according to the present invention, there is provided a valve assembly for quick disassembly comprising a valve body including an elongated sleeve having an axis, generally opposed slots through opposite side walls thereof, first and second valve openings through the sleeve and a valve seat adjacent one end of the body and between the first and second openings. A valve member is provided in the sleeve and movable axially therein between a valve closed position engaged with the seat and a valve open position spaced from the seat to enable fluid communication between the openings, the valve member having a laterally opening slot therethrough in registry with the opposed slots of the sleeve. Means are provided for moving the member between the valve open and valve closed positions including a cam follower carried by the member in the slot thereof. A cam is carried by the body for movement in the slots of the sleeve and the slot of the member in a direction generally normal to the direction of movement of the member, the cam having cam surfaces engageable with the cam follower to move the member toward one of the valve open or valve closed positions in response to movement of the cam in the normal direction. A guide is provided for the cam extending in the slots of the sleeve and the slot of the member and means are provided cooperable between the guide and the body for preventing translational movement thereof relative to the body. A cap is disposed on the body adjacent the end of the body remote from the seat and means are provided for releasably connecting the cap and the body one to the other such that, upon releasing the cap, the cam and the guide may be displaced along the slots of the sleeve for removal through the open end of the sleeve remote from the seat and the valve member and the cam follower may be displaced through the open end of the sleeve.

In a further preferred embodiment according to the present invention, there is provided in combination a boat having a hull with a drain port therethrough for draining the bilge of the boat and a linear actuated valve having a valve body including an elongated sleeve. Means are provided for securing the sleeve to the hull. The sleeve has an axis, a first valve opening in communication with the bilge, a second valve opening in communication with the drain port, and a valve seat between the openings. A valve member is disposed in the sleeve and movable axially between a valve closed position engageable with the seat and a valve open position spaced from the seat to enable fluid communication between the first and second openings, the member having a laterally opening slot therethrough. Means are carried by the sleeve for biasing the valve member toward the valve closed position. A cam follower is carried by the member in the slot thereof, and a cam is carried by the body for movement in the slot of the member in a direction generally normal to the axis of the body, the cam having a surface engageable with the cam follower enabling movement of the member toward the valve closed position in response to movement of the cam in the normal direction and the bias of the biasing means. A control station is provided on the boat remote from the valve, and means operable from the remote control station are provided for linearly moving the cam along the slots to open and close the valve.

Accordingly, it is a primary object of the present invention to provide a novel and improved linearly actuated valve for remote operation including, without limitation, features which enable ready disassembly and reassembly of the valve, maintenance of the valve in its open or closed positions without control pressure and valve actuation with minimum control pressure.

These and further objects and advantages of the present invention will become more apparent upon reference to the following specification, appended claims and drawings.

DETAILED DESCRIPTION OF THE DRAWING FIGURES

Reference will now be made in detail to the present preferred embodiment of the invention, an example of which is illustrated in the accompanying drawings.

Figure 1:
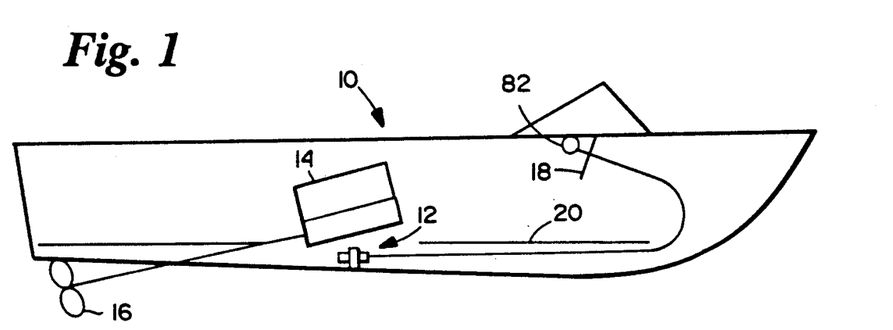
FIG. 1 is a schematic illustration of a boat having a valve, constructed in accordance with the present invention, disposed in the boat hull bottom for draining the bilge.

Referring now to FIG. 1, there is schematically illustrated a boat, generally designated 10, and a valve, generally designated 12, constructed in accordance with the present invention, disposed in boat 10. Boat 10 includes an inboard engine 14 driving a propeller 16 and also a dash 18 for mounting various controls, such as a steering wheel and the like, as will be appreciated by those skilled in this art. The deck of the boat is illustrated at 20, the bilge being below deck 20. It will be appreciated that the engine 14 is enclosed within a housing, not shown, which conventionally has a cover or lid which must be raised for access to the engine compartment and, consequently, access to the valve 12 in the bilge below boat deck 20.

Figure 2:
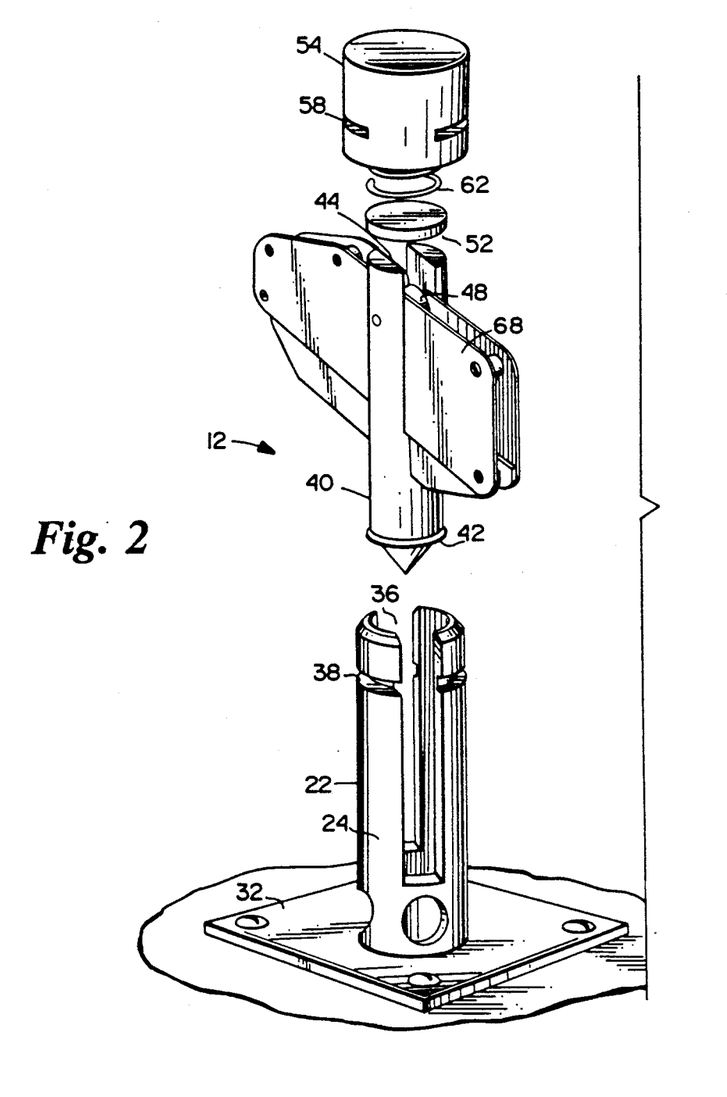
FIG. 2 is an enlarged fragmentary perspective view of the valve of FIG. 1 with parts thereof in exploded juxtaposition relative to one another.
Figures 3, 4:
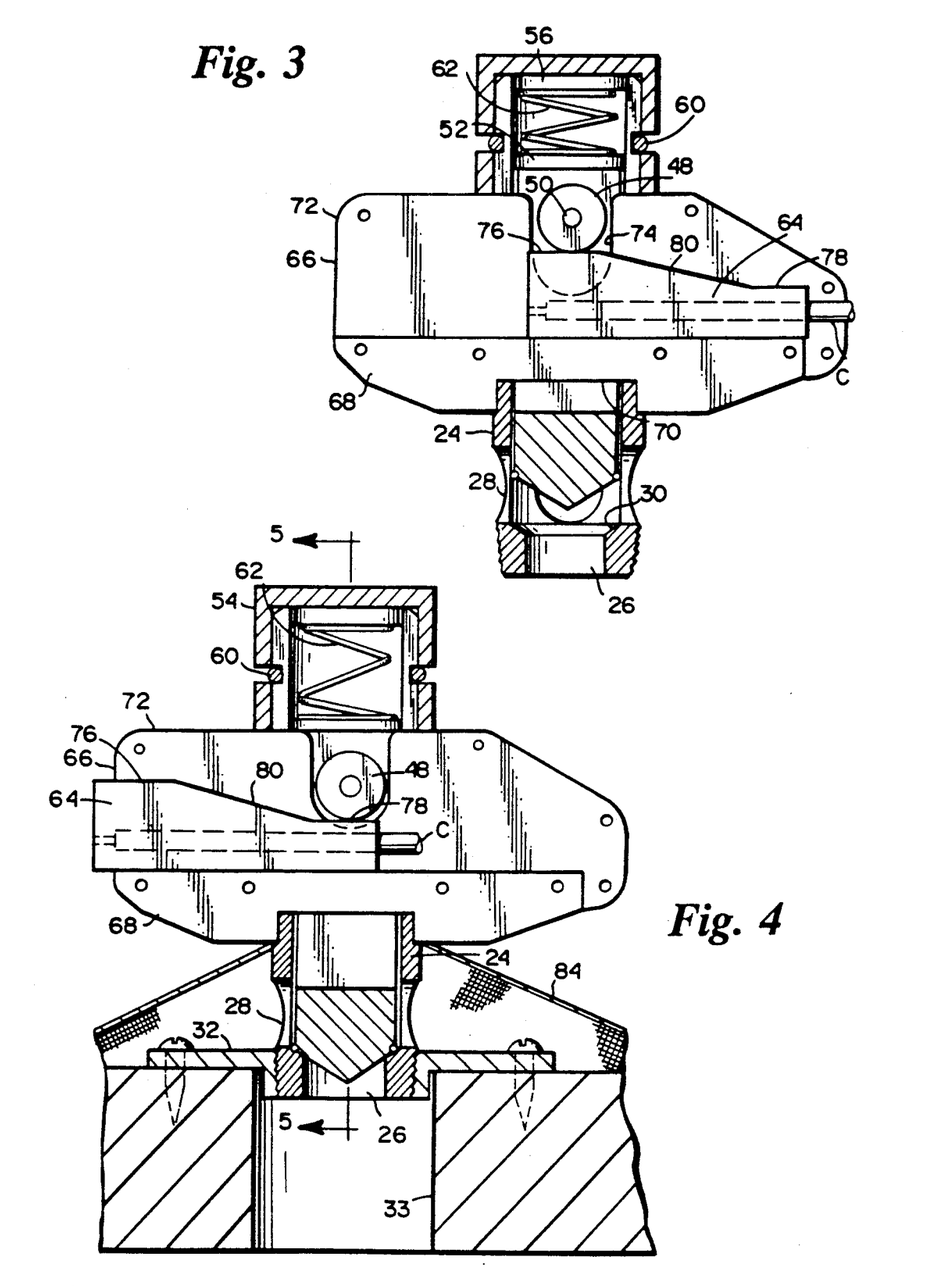
FIG. 3 is an enlarged cross-sectional view of the valve of FIG. 1 illustrated in a valve-open position.
FIG. 4 is a view similar to FIG. 3 illustrating the valve in its closed position.
Figure 5:
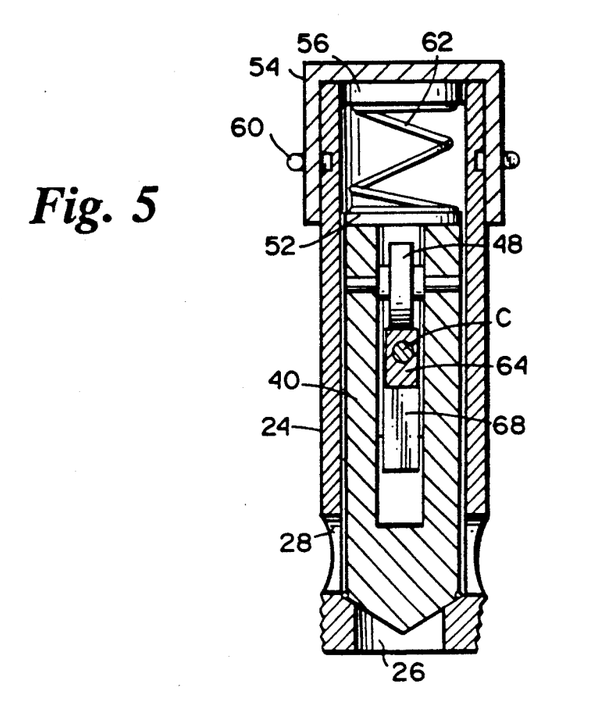
FIG. 5 is a cross-sectional view thereof taken generally about on line 5—5 in FIG. 4.

Referring now to FIG. 2, valve 12 includes a valve body 22 comprised of a sleeve 24. With reference to FIGS. 3 and 4, it will be seen that sleeve 24 has a valve opening 26 through its lower end, a plurality of radially disposed openings 28 adjacent the lower end of the sleeve and a valve seat 30 between openings 26 and 28, valve seat 30 comprising a frustoconical surface. To mount the valve in the hull of boat 10, there is provided a conventional fitting 32 having an internally threaded opening corresponding to the opening 33 through the hull and which fitting is conventionally secured to the hull, for example, by screws. The lower end of sleeve 24 is externally threaded for threaded engagement with the internally threaded fitting 32. Thus, valve body 22 upstands from the bottom of the boat hull.

As best illustrated in FIG. 2 valve sleeve 24 has a pair of slots 36 which open through diametrically opposite sides of the valve above valve ports 28 to define arcuate sleeve segments. Additionally, a groove 38 is disposed about sleeve 24 adjacent its upper end for reasons which will be apparent from the ensuing description.

Valve 12 also includes a valve member 40 which is axially received within sleeve 24 for movement in the axial direction. The lower end of valve member 40 is conically shaped and provided with an O-ring seal 42 for engaging seat 30 in the valve-closed position, thus sealing ports 26 and 28 one from the other. A slot 44 is formed diametrically through valve member 40 over the majority of its length. Thus, member 40 is bifurcated to define discrete segments 46 on opposite sides of slot 44. When member 40 is assembled in sleeve 24, slot 44 lies in registry with slots 36 of sleeve 24.

A cam follower 48, for example, a roller, is disposed in slot 44 between segments 46. Cam follower 48 is carried on a shaft 50 mounted in segments 46. A disk 52 is disposed on top of member 40 but is not secured thereto.

A cap 54 comprising a generally inverted, cup-shaped cylindrical section is provided at the top of valve 12. Cap 54 includes a disk 56 along its underside and a pair of grooves 58 pass through the opposite side walls of the cap. When cap 54 is applied to valve sleeve 24, a spring clip 60 may be inserted through grooves 58 and into registering grooves 38 to maintain the cap assembled on sleeve 24 and the valve subassembly assembled within the valve. Additionally, there is provided a biasing means, for example, a helical coil spring 62, which seats at opposite ends, when the valve is assembled, against disks 56 and 52, respectively, to bias member 40 for movement in an axially downward direction, i.e., toward the valve-closed position illustrated in FIG. 4.

Disposed in the laterally registering slots 36 and 44 of the sleeve 24 and member 40, respectively, are a cam 64 and a guide 66 for the cam. Guide 66 includes a base frame 68 having a slot 70 along its underside for engaging the base of slots 36. That is, the recess or slot 70 straddles the base of slots 36 and prevents lateral movement of guide 66 in the slots. Guide 66 also includes a pair of laterally spaced guide plates 72 secured to base frame 68 and upstanding therefrom in slots 36 and 44. Each guide plate 72 includes an aperture 74 opening through its upper edge for receiving cam follower 48.

Cam 64 comprises a member slidable along the upper surface of base frame 68 between guide plates 72. Cam 64 has cam surfaces including a pair of flats 76 and 78 laterally spaced one from the other and connected one to the other by an inclined cam surface 80. It will be appreciated from a review of the drawing figures, that cam surfaces 76, 78 and 80 are designed for engagement with cam follower 48. It will also be appreciated that biasing means 62, when the valve is assembled, causes the cam follower 48 to bear against one of the surfaces of cam 64 to maintain the subassembly, including guide 66, in the valve assembly.

Cam 64 may be translated in a lateral direction to open and close the valve, e.g., by means of a cable C. This may be a conventional bowden-type cable which may be routed, as in FIG. 1, to a control knob 82 disposed on dash 18 or an otherwise readily accessible control station on the boat. Thus, by a push-pull actuation of control knob 82, cam 64 may be displaced along guide 66 to engage one of the cam surfaces 76, 78 and 80 with cam follower 48. In FIG. 4, there is illustrated a screen 84 which is secured between valve sleeve 24 and the boat hull to prevent debris and the like from entering the valve openings 28 and 26.

Figure 7A:
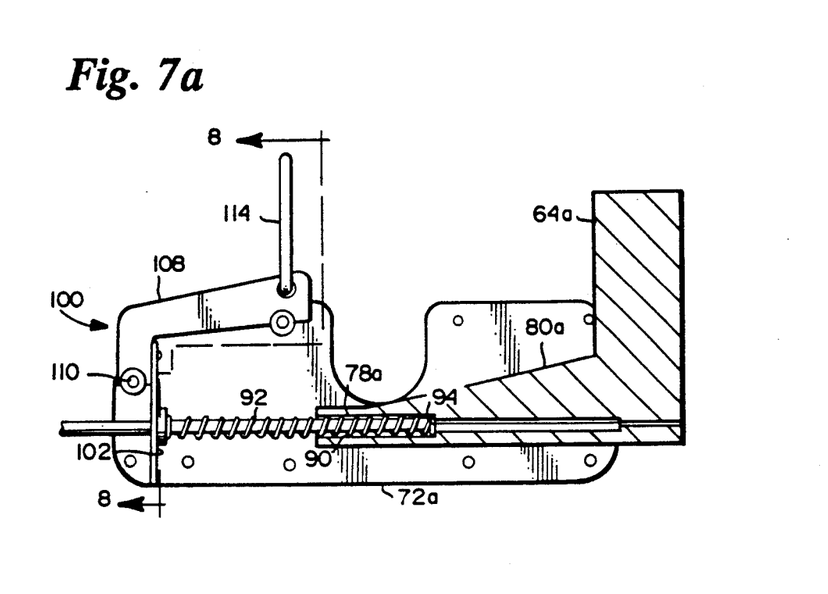
FIG. 7a is a view similar to FIG. 4 illustrating a different form of cam whereby the valve is self-closing as well as a guillotine.

Referring now to FIG. 7, the cam 64a is illustrated with a lower flat 78a and an inclined linear surface 80a. Additionally, the cam 64a has a recess 90 for receiving the cable as well as a coil spring 92. One end of coil spring 92 abuts an annular surface 94 in the recess, while the opposite end of coil spring 92 bears against an abutment extending between the guide plates 72a. In this manner, when the cable is pulled, the cam follower bears against surface 80a to open the valve and a continuous bias is applied to the cam in the valve closing position by both the cooperation of the cam follower and inclined surface 80a, as well as by the coil spring 92.

Figure 7B:
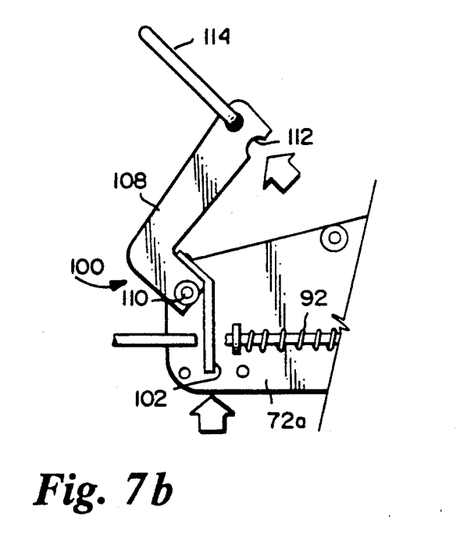
FIG. 7b is a fragmentary view of the guillotine in the cutting position.
Figure 8:
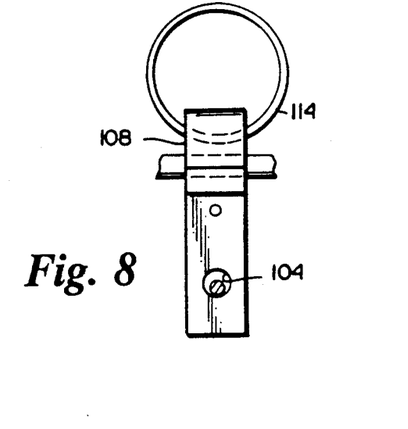
FIG. 8 is a cross-sectional view thereof taken generally about on line 8—8 in FIG. 7b.

For emergency situations, for example, where it is necessary to immediately cut the operating cable, a guillotine mechanism 100 is provided at the valve. The mechanism 100 includes a strip 102 of steel having an aperture 104 therethrough which is sharpened about its lower edge. The strip 102 is disposed between the guide plates 72a, in suitable guides, not shown, with the cable routed through aperture 104. The upper end of strip 102 is secured to a lever 108 pivoted to and between the guide plates 72a at 100. The opposite end of the level is notched at 112 to snap-fit over a transverse pin connecting guide plates 72a one to the other. A pull ring 114 is carried by the lever 108. By pulling on ring 114 and pivoting lever 108, the strip 102 is displaced upwardly, causing the lower sharpened edge of the aperture to cut through the cable thereby freeing the valve for manual actuation.

In operation, when it is desired to drain the bilge of boat 10, for example, when it is placed on a trailer, valve 12 will normally lie in its closed position, as illustrated in FIG. 4. Note that cam follower 48 engages cam surface 78, enabling member 40 to be biased by spring 62 into the valve-closed position. To open the valve, knob 82 is pulled, causing cam 64 to be linearly displaced in the lateral direction, for example, from left to right, as illustrated in FIG. 4, into the position illustrated in FIG. 3. Thus, cam follower 48 will ride along inclined surface 80, hence raising member 40 within sleeve 24 until it rests on flat 76. In that position as illustrated in FIG. 3, the valve is in its full open position. It will be appreciated that because of the slope of the inclined surface 80, very little control pressure is required to open the valve. Also, when the valve reaches its full open position illustrated in FIG. 3, there is no control pressure exerted on the control knob 82 by the valve because any tendency of the valve to move toward its closed position is resisted by cam 64 between cam follower 48 and base frame 68. Once the boat is completely drained, knob 82 may be pushed toward dash 18 to displace cam 64 from right to left, as illustrated in FIGS. 3 and 4, into the valve-closed position illustrated in FIG. 4. Note that when the cam follower initially engages inclined surface 80, the bias of spring 62 causes a control pressure, tending to move the cam 64 to the valve-closed position.

Figure 6:
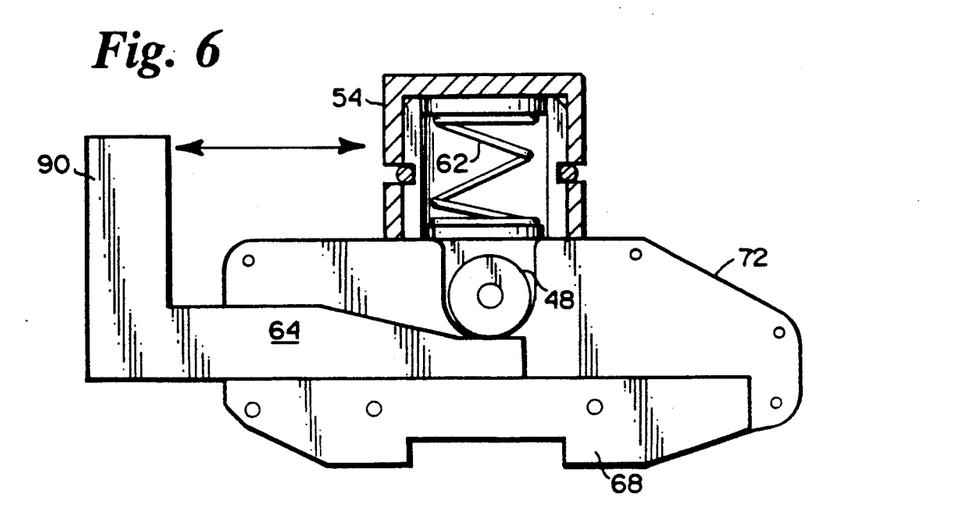
FIG. 6 is a cross-sectional view of upper portions of the valve illustrated in FIGS. 3 and 4 with a modified cam.

With respect to the embodiment hereof illustrated in FIG. 6, it may be desirable to manually operate the valve. To facilitate this, cam 64 may be provided with an upstanding handle 90 which projects from one end of the cam. Consequently, it will be appreciated that handle 90 may be grasped by an individual and cam 64 manually laterally displaced between valve open and closed positions similarly as previously described with respect to the cable control of the position of the cam.

An important feature of the present invention resides in the ability of the valve to be quickly disassembled and reassembled. Referring back to FIGS. 2-4, it will be appreciated that the spring bias is resisted by the engagement of the spring against the cap 54 which is secured to sleeve 24 by spring clip 60. To disassemble the valve, the spring clip 60 is removed from the aligned grooves 38 and 58 to release cap 54. Upon removal of cap 54, the spring 62 and disk 52 may be removed. The entire guide 66, cam 64, as well as the member 40 and cam follower 48, may then be lifted from the sleeve 24 along slots 36 thereof for removal through the open upper end of sleeve 24. Upon removal, the cam may be removed from the guide and guide 66 removed from member 40.

To reassemble the valve, the cam 64 is inserted between guide plates 72 and guide 66 is inserted in slot 44 of member 40. This entire subassembly may then be received in sleeve 24, with guide 66 engaging in slots 36. Disk 52 and spring 62 are then disposed in the upper end of sleeve 24 and cap 54 is applied about sleeve 24 and secured by spring clip 60. As a consequence of this construction, it will readily be appreciated that the valve may be easily disassembled for cleaning or oil changes as necessary and reassembled for further use.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A linear actuated fluid valve, comprising
  a valve body including an elongated sleeve having an axis, generally opposed slots through opposite side walls thereof, a first valve opening through a side wall, a second valve opening through an end of said sleeve, and a valve seat about said sleeve between said openings;
  a valve member in said sleeve and movable axially between a valve closed position engageable with said seat and a valve open position spaced from said seat to enable fluid communication between said first and second openings, said member having a laterally opening slot therethrough in registry with said opposed slots of said sleeve;
  means carried by said sleeve for biasing said valve member toward one of said valve open or valve closed positions;
  a cam follower carried by said member in said slot thereof;
  a cam carried by said body for movement in the slots of said sleeve and the slot of said member in a direction generally normal to the axis of said body, said cam having a surface engageable with said cam follower enabling movement of said member toward said valve open or valve closed position in response to movement of said cam in said normal direction and the bias of said biasing means; and
  means for linearly moving said cam along said slots.

2. A valve according to claim 1 wherein said cam includes a surface extending in the direction of movement of said cam at an angle other than 90° to both said normal and axial directions.

3. A valve according to claim 1 including a guide connected to said sleeve, said cam being slidable in said slots along said guide.

4. A valve according to claim 3 wherein said guide includes a pair of guide plates spaced one from the other and extending in said slots of said sleeve and the slot of said member, said cam being slidable between said guide plates.

5. A valve according to claim 4 including a base frame between said guide plates, said cam being slidable along said base frame.

6. A valve according to claim 4 wherein said cam follower comprises a roller.

7. A valve according to claim 1 including a cap mounted on said body, said biasing means being disposed between said member and said cap, means for releasably connecting said cap and said body one to the other such that, upon removal of said cap from said body, said cam follower, said member, said biasing means and said cam are removable from said valve body.

8. A valve according to claim 7 wherein said valve seat lies adjacent one end of said sleeve, the slots in said sleeve opening through the end thereof opposite said one end, the slot in said member opening through a corresponding end thereof as said sleeve whereby, upon removal of said cap, said cam follower, said member, said biasing means and said cam are removable from said valve by sliding thereof toward and for removal from the opposite end of said sleeve from said one end thereof.

9. A valve according to claim 1 wherein said cam has a pair of flat surfaces extending generally normal to said axis and a surface between and inclined relative to said flat surfaces, said cam being movable linearly between a first valve closed position with the cam follower engaged on one of said flat surfaces and a second valve open position with the cam follower engaged on the other of said flat surfaces.

10. A valve according to claim 1 wherein said linear moving means includes a cable connected at one end to said cam, and at its opposite end, to a remotely located control.

11. A valve according to claim 1 including a handle carried by said cam for manually moving said cam in said normal direction.

12. A valve according to claim 1 including a cable for moving said cam, and means carried by said valve for cutting said cable.

13. A valve assembly for quick disassembly comprising:
  a valve body including an elongated sleeve having an axis, generally opposed slots through opposite side walls thereof, first and second valve openings through said sleeve and a valve seat adjacent one end of said body and between said first and second openings;
  a valve member in said sleeve and movable axially therein between a valve closed position engaged with said seat and a valve open position spaced from said seat to enable fluid communication between said openings;
  said valve member having a laterally opening slot therethrough in registry with the opposed slots of said sleeve;
  means for moving said member between said valve open and valve closed positions including a cam follower carried by said member in said slot thereof and a cam carried by said body for movement in the slots of said sleeve and the slot of said member in a direction generally normal to the direction of movement of said member, said cam having cam surfaces engageable with said cam follower to move said member toward one of said valve open or valve closed positions in response to movement of said cam in said normal direction;
  a guide for said cam extending in the slots of said sleeve and the slot of said member and means cooperable between said guide and said body for preventing translational movement thereof relative to said body;
  a cap on said body adjacent the end of said body remote from said seat; and
  means releasably connecting said cap and said body one to the other such that, upon releasing said cap, said cam and said guide may be displaced along the slots of said sleeve for removal through the open end of said sleeve remote from said seat and said valve member and said cam follower may be displaced through said open end of said sleeve.

14. In combination with a boat having a hull with a drain port therethrough for draining the bilge of the boat, a linear actuated valve having a valve body including an elongated sleeve, means for securing said sleeve to said hull, said sleeve having an axis, a first valve opening in communication with the bilge, a second valve opening in communication with said drain port, and a valve seat between said openings, a valve member in said sleeve and movable axially between a valve closed position engageable with said seat and a valve open position spaced from said seat to enable fluid communication between said first and second openings, said member having a laterally opening slot therethrough, means carried by said sleeve for biasing said valve member toward said valve closed position, a cam follower carried by said member in said slot thereof, a cam carried by said body for movement in the slot of said member in a direction generally normal to the axis of said body, said cam having a surface engageable with said cam follower enabling movement of said member toward said valve closed position in response to movement of said cam in said normal direction and the bias of said biasing means, a control station on said boat remote from said valve, and means operable from said remote control station for linearly moving said cam along said slots to open and close said valve.

15. The combination of claim 14 wherein said sleeve has generally opposed slots through opposite side Walls thereof, the laterally opening slot of said member lying in registry with the opposed slots of said sleeve, said cam being disposed for movement in the slots of said sleeve.

16. The combination according to claim 15 wherein said cam includes a surface extending in the direction of movement of said cam at an angle other than 90° to both said normal and axial directions.

17. The combination according to claim 15 including a guide connected to said sleeve, said cam being slidable in said slots along said guide.

18. The combination according to claim 17 wherein said guide includes a pair of guide plates spaced one from the other and extending in said slots of said sleeve and the slot of said member, a base frame between said guide plates, said cam being slidable between said guide plates and along said base frame.

19. The combination according to claim 15 including a cap mounted on said body, said biasing means being disposed between said member and said cap, means for releasably connecting said cap and said body one to the other such that, upon removal of said cap from said body, said cam follower, said member, said biasing means and said cam are removable from said valve body.

20. The combination according to claim 19 wherein said valve seat lies adjacent one end of said sleeve, the slots in said sleeve opening through the end thereof opposite said one end, the slot in said member opening through a corresponding end thereof as said sleeve whereby, upon removal of said cap, said cam follower, said member, said biasing means and said cam are removable from said valve by sliding thereof toward and for removal from the opposite end of said sleeve from said one end thereof.

21. The combination according to claim 20 wherein said cam has a pair of flat surfaces extending generally normal to said axis and a surface between and inclined relative to said flat surfaces, said cam being movable linearly between a first valve closed position with the cam follower engaged on one of said flat surfaces and a second valve open position with the cam follower engaged on the other of said flat surfaces.

* * * * *